United States Patent [19]

Oberthür

[11] 4,198,101

[45] Apr. 15, 1980

[54] LOAD RESPONSIVE BRAKE FORCE REGULATOR

[75] Inventor: Heinrich Oberthür, Offenbach-Rumpenheim, Fed. Rep. of Germany

[73] Assignee: ITT Industries, Incorporated, New York, N.Y.

[21] Appl. No.: 928,653

[22] Filed: Jul. 28, 1978

[30] Foreign Application Priority Data

Sep. 26, 1977 [DE] Fed. Rep. of Germany ....... 2743191

[51] Int. Cl.² ............................................... B60T 8/26
[52] U.S. Cl. .................................. 303/22 R; 188/195; 303/6 C
[58] Field of Search .................. 303/22 R, 22 A, 6 C; 188/195, 349

[56] References Cited

U.S. PATENT DOCUMENTS 3,341,258  9/1967  Dobrikin et al. .............. 303/22 R X

FOREIGN PATENT DOCUMENTS 1780560  2/1972  Fed. Rep. of Germany.
2422676  11/1975  Fed. Rep. of Germany ........ 303/22 R Primary Examiner—Douglas C. Butler
Attorney, Agent, or Firm—John T. O'Halloran; Alfred C. Hill

[57] ABSTRACT

A load-responsive brake-force regulator for a vehicular hydraulic brake system includes a balance beam having a variable point of support to determine the transmission ratio for the brake pressure, two rollers disposed in a cage to support the balance beam, an actuating tongue disposed between the two rollers and two compression springs between which the cage is disposed such that the cage is centered into the position determined by the actuating tongue.

4 Claims, 2 Drawing Figures

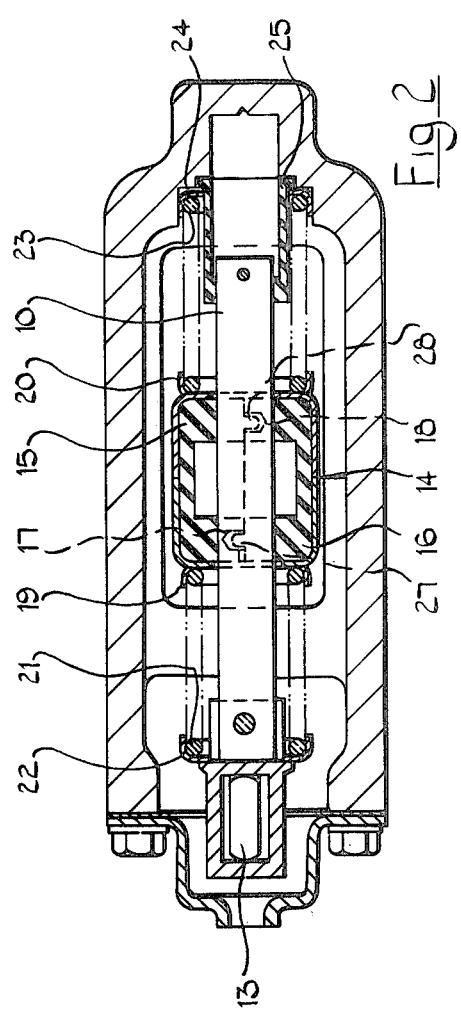

LOAD RESPONSIVE BRAKE FORCE REGULATOR

BACKGROUND OF THE INVENTION

This invention relates to a load-responsive brake-force regulator for a vehicular hydraulic brake system, the static characteristics of which run radially and wherein the brake pressure supplied to the wheel brakes at the rear axle is regulated by the adjustment of the transmission ratio which is effected continually dependent on the instantaneous axle-load distribution by means of a balance beam, the one lever arm of which is linked to an actuating piston exposed to the master cylinder pressure while its other lever arm is linked to a control piston, with the control piston actuating a control valve arranged in the pressurized-fluid line leading from the master cylinder to the wheel brakes at the rear axle, and with the balance beam bearing upon two rollers held in a guide cage and adapted to move along a rail dependent on the instantaneous axle-load distribution by means of an actuating tongue disposed between the rollers, the one roller serving as a support for the balance beam and the other roller resting on the rail, with the two rollers being able to move with rolling contact on the balance beam and on the rail, respectively.

Such a load-responsive brake-force regulator is known from German Pat. No. Dt-AS 1,780,560. In the known brake-force regulator, two tension springs are provided urging, in the normal position, the guide cage against a stop secured to the housing. Thus, in the normal position, there is a defined position of the guide cage relative to the balance beam. However, if the actuating tongue moves as a result of an increase in the axle load, the guide cage is bound to move against the unilaterally acting force of the tension springs. As long as there is static-friction engagement between the rollers and the actuating tongue, between the one roller and the balance beam and between the other roller and the rail, the amount of displacement of the guide cage corresponds precisely to half of the amount of displacement of the actuating tongue. However, the case may be that this static friction is not fully present which may be due to vibrations or other causes. In that case, the actuating tongue is able to move between the rollers without there being a suitable displacement of the guide cage. As a result, the required proportional relationship between the change in the axle load and the brake-force distribution is lost.

SUMMARY OF THE INVENTION

It is the object of the present invention to design a load-responsive brake-force regulator of the type initially referred to in such a manner as to ensure an accurate dependent relationship between the displacement of the actuating tongue and the displacement of the guide cage resulting therefrom under all conditions occurring during the operation of automotive vehicles.

A feature of the present invention is the provision of a load-responsive brake-force regulator for a vehicular hydraulic brake system comprising: a balance beam having one lever arm coupled to an actuating piston exposed to pressure coming from a master cylinder and the other lever arm coupled to a control piston which actuates a control valve disposed in a pressurized-fluid line leading from the master cylinder to wheel brakes at a rear axle of a vehicle; a pair of rollers held in a guide cage, one of the pair of rollers supporting and moving with rolling contact on the balance beam and in rolling contact with an actuating tongue and the other of the pair of rollers in rolling contact with the actuating tongue and in rolling contact with a rail, the actuating tongue being moved dependent on a control force proportional to the instantaneous distribution of the axle-load of the rear axle; and a pair of compression springs, one of the pair of compression springs being disposed coaxial of the actuating tongue and extending between one side of the guide cage and a first stop on the actuating tongue adjacent a point of application of the control force to the actuating tongue and the other of the pair of compression springs being disposed coaxially of the actuating tongue and extending between the other side of the guide cage and a second stop formed in a housing for the brake-force regulator remote from the point of application of the control force.

It results from this design that the guide cage is necessarily held in a middle position by the force of two counteracting compression springs.

If the actuating tongue becomes displaced as a result of a change in the axle load, the forces of the two springs will change completely evenly. The position of the guide cage resulting from the displacement of the actuating tongue is necessarily the position in which both springs bear against the guide cage with identical forces. Should, for any reasons whatsoever, the guide cage not immediately assume the position resulting from the displacement of the actuating tongue, uneven spring forces will act upon the guide cage and thus urge it into the proper position.

In an advantageous embodiment of the invention, a spring plate component is provided on either side of the guide cage to provide a support for the compression springs, these components embracing the guide cage laterally up to its middle such that the components mutually bear upon one another.

It is achieved by this design that the compression springs do not bear upon the guide cage; on the contrary, the forces counterbalance each other as a result of the mutual contact of the spring plate components. This is a great advantage since the guide cage is conventionally an inexpensive plastics material and unable to take high forces.

In another advantageous embodiment of the invention, the guide cage includes two halves fitted into each other and held together by the two spring plate components. This design avoids the need for special connecting elements for holding the two halves of the guide cage together and affords a particularly inexpensive manufacture of the brake-force regulator of the present invention.

BRIEF DESCRIPTION OF THE DRAWING

Above-mentioned and other features and objects of this invention will become more apparent by reference to the following description taken in conjunction with the accompanying drawing, in which:

FIG. 2 is a longitudinal cross-sectional view taken along line II—II of the brake-force regulator of FIG. 1.

DESCRIPTION OF THE PREFERRED EMBODIMENT

Figure 1:
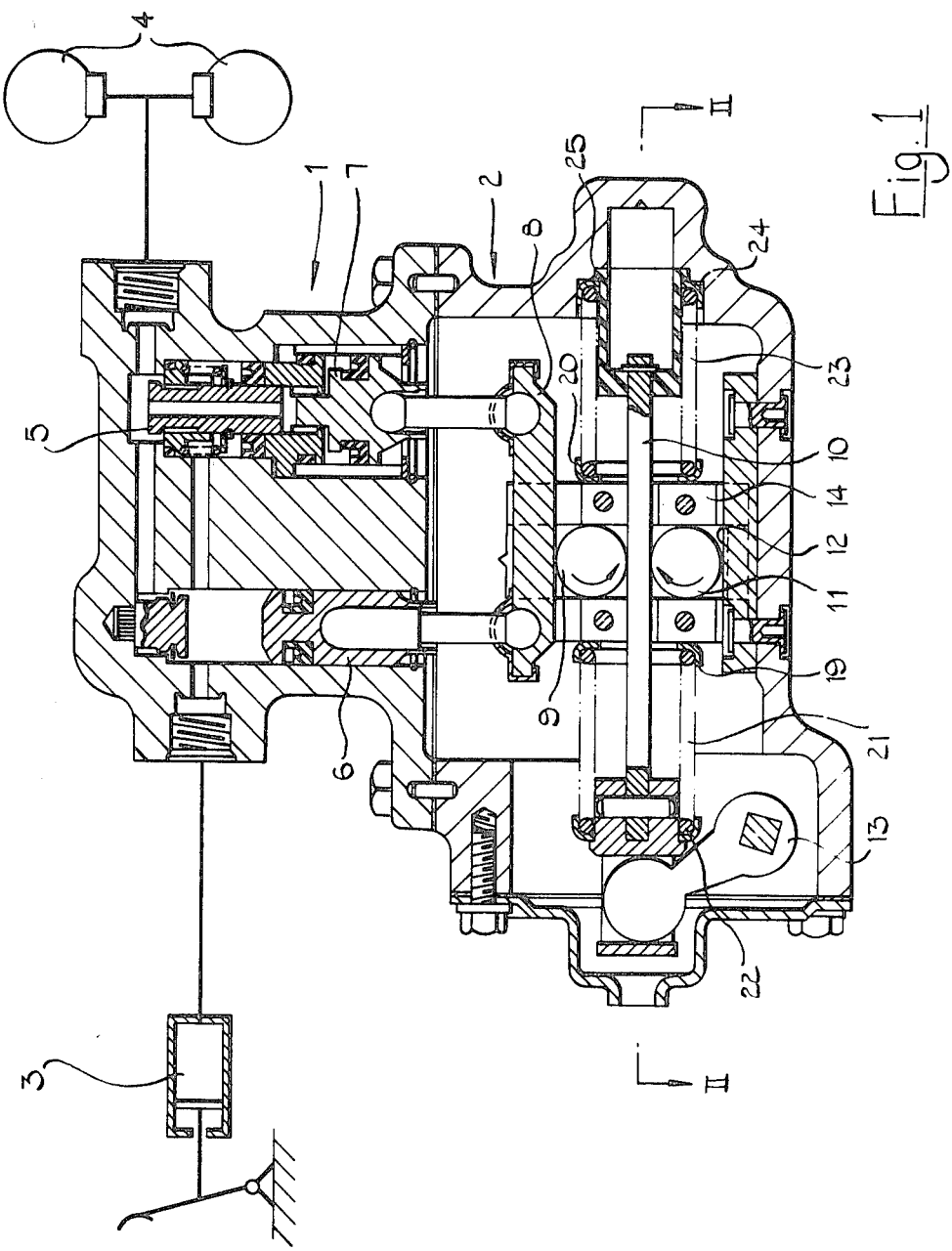
FIG. 1 is a longitudinal cross-sectional view of the brake-force regulator constructed in accordance with the principles of the present invention.

The load-responsive brake-force regulator illustrated in FIGS. 1 and 2 comprises a hydraulic section 1 and a mechanical section 2. The hydraulic section 1 corresponds substantially to the hydraulic section of the regulator disclosed in the above-cited German Patent and includes normally open control valve 5 to control the flow of pressurized fluid through the load-responsive brake-force regulator from a master cylinder 3 to the rear-wheel brakes 4. Control valve 5 is controlled by an actuating piston 6 and a control piston 7 through a balance beam 8 which is a portion of mechanical section 2. Pistons 6 and 7 each have the same effective area exposed to pressure produced in master cylinder 3 and each bear against opposite ends of the common balance beam 8 through means of pins. The effective area of piston 7 is exposed to pressurized fluid from master cylinder 3 through the axial bore of valve 5. Balance beam 8 bears against a roller 9 which provides a load dependent balance point for balance beam 8 as set forth hereinbelow. Due to the force acting on the effective areas of pistons 6 and 7 by hydraulic pressure from master cylinder 3 and brakes 4 and the individual lever length of balance beam 8 from the balance point provided by roller 9, an equilibrium of forces is established. By virtue of the force transmitted from piston 6 via balance beam 8 to piston 7, a control force is exerted on valve 5 which will control the pressure in the wheel cylinders of rear-wheel brakes 4. The effective area of pistons 6 and 7 and the effective lever lengths of balance beam 8 results in a proportional relationship between the master-cylinder pressure and the brake pressure in brakes 4 which is variable in response to the load on the vehicle, since the balance point of balance beam 8 provided by roller 9 is moved in response to the load on the vehicle through means of actuating tongue 10 as set forth hereinbelow.

The balance beam 8 bears upon a roller 9 in the mechanical section 2 of the brake-force regulator. The roller 9 rests on an actuating tongue 10 which in turn takes support upon a roller 11. The roller 11 is movable on a rail 12.

The transmission ratio of the brake-force regulator is changed in response to the axle load by pivoting a lever 13 which displaces the actuating tongue 10.

The rollers 9 and 11 are held in a guide cage 14. The guide cage 14 is preferably a plastics material. As can be seen in FIG. 2, guide cage 14 includes two identical halves 15 and 16. Each half 15 and 16 has at least one hole 17 and 18 into which a projection 27 and 28 of the other half 15 and 16 extends.

Spring plate components 19 and 20 each include a first portion disposed in a transverse relationship with and coaxial of actuating tongue 10 abutting the associated end of guide cage 14 and a second portion disposed parallel to actuating tongue 10 and tightly embracing the outer surfaces of halves 15 and 16 of guide cage 14 to hold these two halves together. As shown in FIG. 2 the adjacent ends of the second portions of spring plate components 19 and 20 abut one another so that spring forces applied to spring plate components 19 and 20 are not transmitted to guide cage 14.

A compression spring 21 bears against the first portion of spring plate component 19 and rests with its other end against a stop 22 of the actuating tongue 10. An identical compression spring 23 bears against the first portion of spring plate component 20 and rests with its other end against a stop 24 formed in the housing. A member 25 serves as a guide for the actuating tongue 10.

The operation of the mechanical section 2 of the brake-force regulator of the invention is the following:

If the lever 13 is pivoted clockwise as a result of a change in the axle load, the actuating tongue 10 will become displaced by a specific amount, for instance, by 2 centimeters (cm.) to the right when viewing FIG. 1. As a result, compression spring 21 will be compressed by an amount equal to one half the amount of displacement of actuating tongue 10, i.e., by 1 cm., and thereby exerts a greater force on guide cage 14 than spring 23 and thus moves guide cage 14 to the right when viewing FIG. 1 by 1 cm. This movement of actuating tongue 10 and guide cage 14 causes the upper roller 9 to turn counter-clockwise and the lower roller 11 to turn clockwise due to friction between rollers 9 and 11 and tongue 10 resulting in a movement to the right when viewing FIG. 1 of the balance point of balance beam 8 by 1 cm. This movement of guide cage 14 also causes compression of compression spring 23 by an amount equal to 1 cm., the same amount of compression as compression spring 21, thereby exerting identical spring forces on spring plate components 19 and 20. If guide cage 14 becomes displaced relative to actuating tongue 10 for any reason whatsoever, for instance, due to vibrations, at least one of the compression springs 21 and 23 would cause a unilateral force to act on the associated one of spring plate components 19 and 20 which would again shift guide cage 14 into its proper position.

While I have described above the principles of my invention in connection with specific apparatus it is to be clearly understood that this description is made only by way of example and not as a limitation to the scope of my invention as set forth in the objects thereof and in the accompanying claims.

I claim:

1. A load-responsive brake-force regulator for a vehicular hydraulic brake system comprising:
    a balance beam having one lever arm coupled to an actauting piston exposed to pressure coming from a master cylinder and the other lever arm coupled to a control piston which actuates a control valve disposed in a pressurized-fluid line leading from said master cylinder to wheel brakes at a rear axle of a vehicle;
    a pair of rollers held in a guide cage, one of said pair of rollers supporting and moving with rolling contact on said balance beam and in rolling contact with an actuating tongue and the other of said pair of rollers in rolling contact with said actuating tongue and in rolling contact with a rail, said actuating tongue being moved dependent on a control force proportional to the instantaneous distribution of the axle-load of said rear axle; and
    a pair of compression springs, one of said pair of compression springs being disposed coaxial of said actuating tongue and extending between one side of said guide cage and a first stop on said actuating tongue adjacent a point of application of said control force to said actuating tongue and the other of said pair of compression springs being disposed coaxially of said actuating tongue and extending between the other side of said guide cage and a second stop formed in a housing for said brake-force regulator remote from said point of application of said control force.

2. A regulator according to claim 1, further including a pair of spring plate components, one of said pair of components embracing said one side of said guide cage to provide a support for said one of said pair of compression springs and the other of said pair of components embracing said other side of said guide cage to provide a support for said other of said pair of compression springs, each of said pair of components extending to the middle of said guide cage and bearing against each other.

3. A regulator according to claim 2, wherein said guide cage includes
two halves fitted into each other and held together by said pair of components.

4. A regulator according to claim 1, wherein said guide cage includes
two halves fitted into each other.

* * * * *